May 5, 1970
L. J. RICHARDSON
3,510,810
ROTOR ACTUATOR
Filed Nov. 9, 1967
2 Sheets-Sheet 1
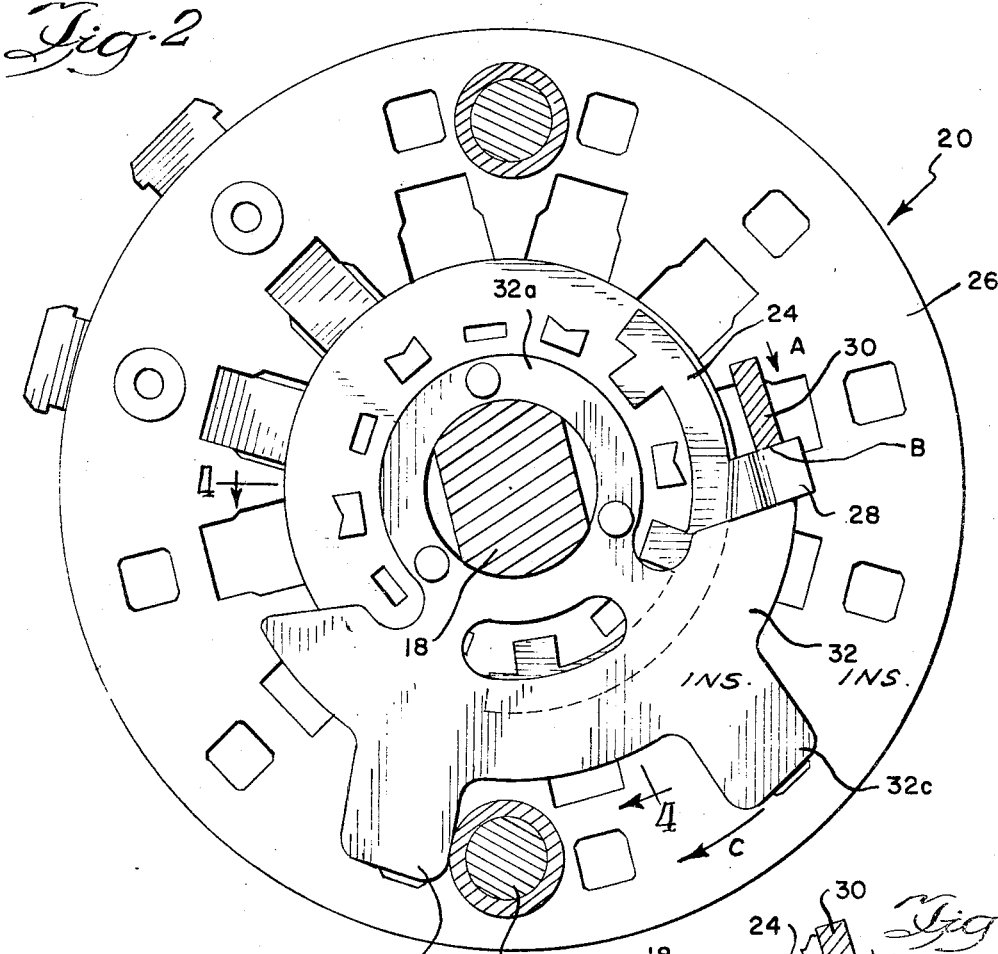
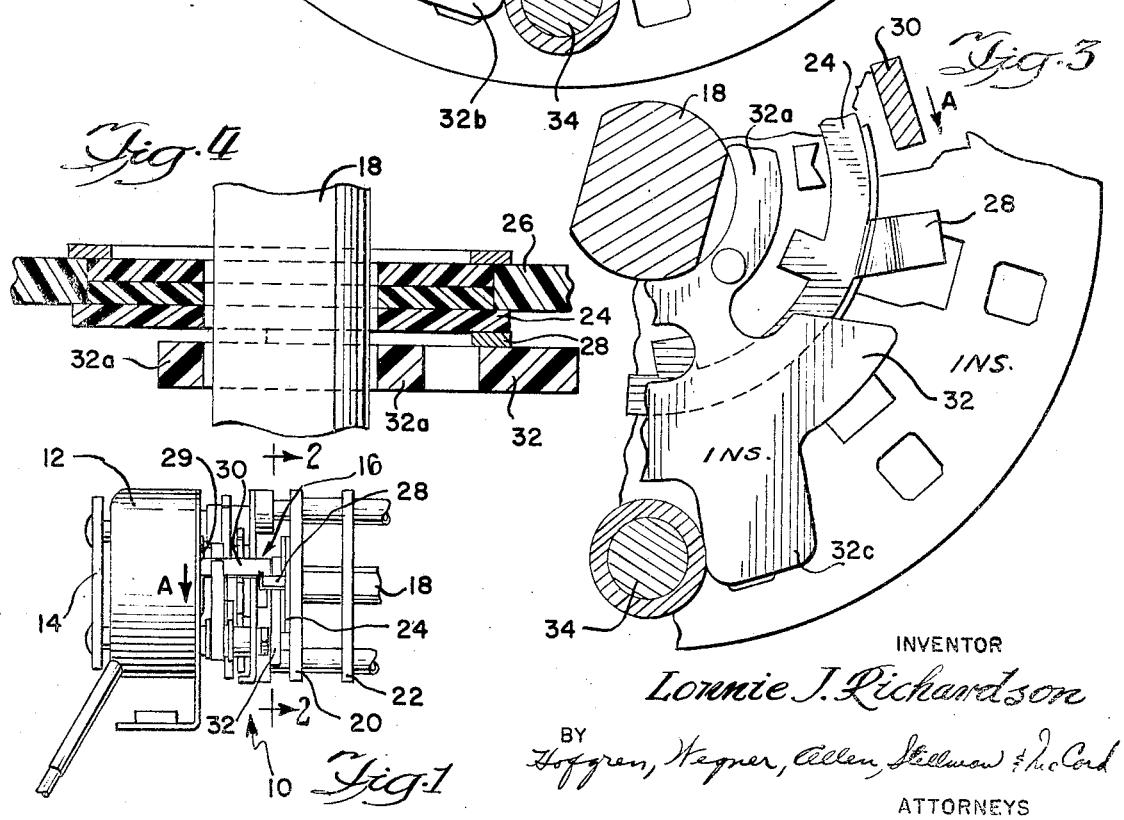
INVENTOR
Lonnie J. Richardson
BY Hofgren, Wegner, Allen, Stellman & McCord
ATTORNEYS May 5, 1970  L. J. RICHARDSON  3,510,810
ROTOR ACTUATOR
Filed Nov. 9, 1967  2 Sheets-Sheet 2
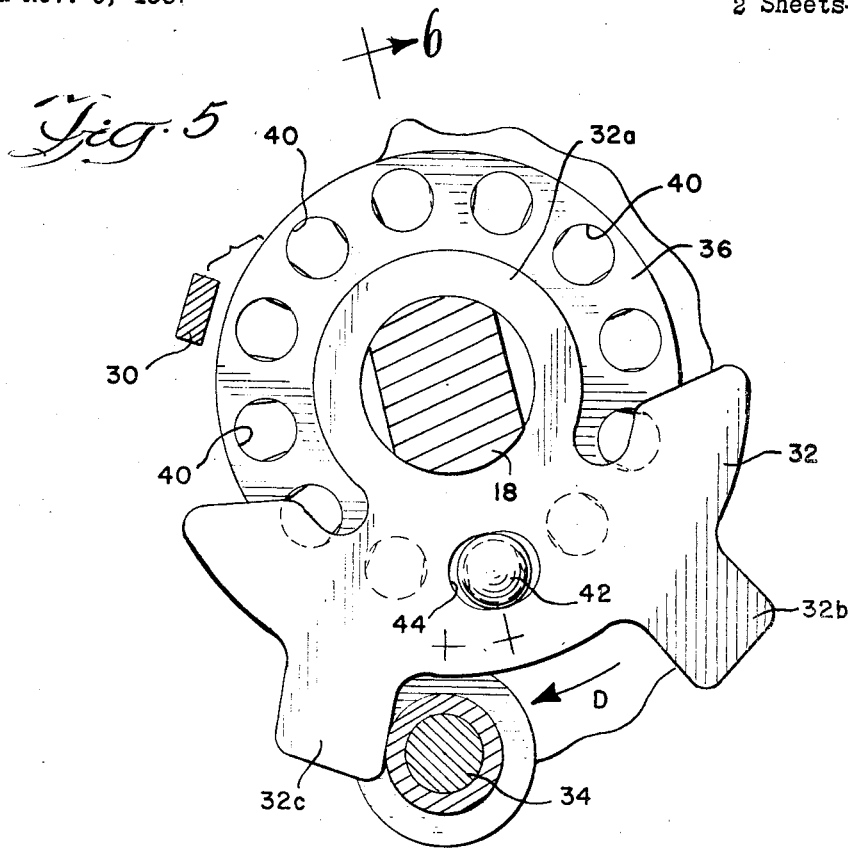
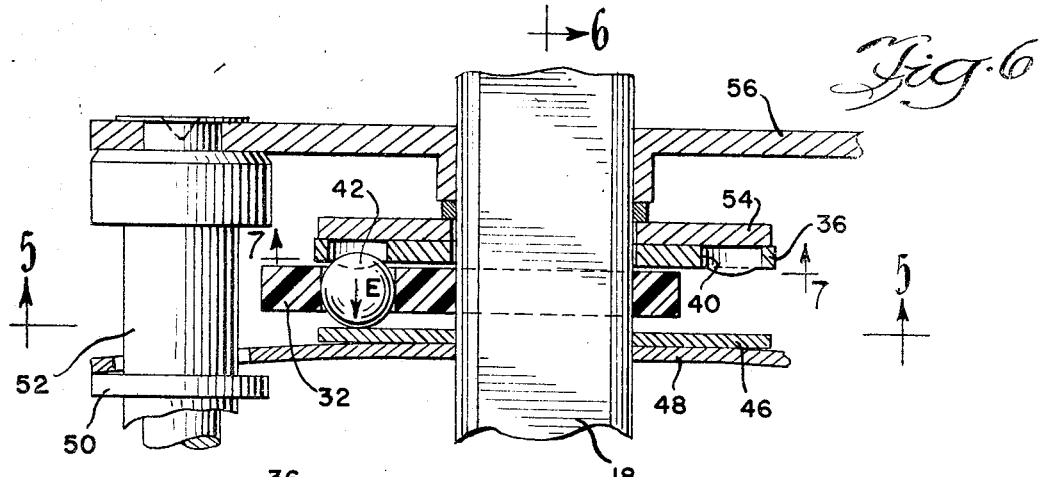
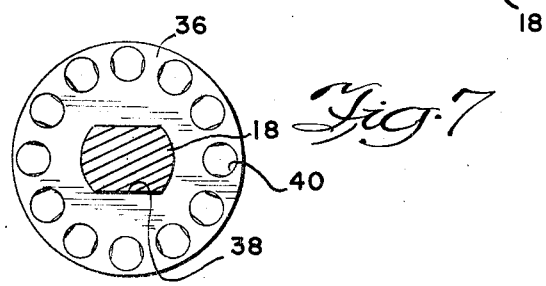

United States Patent Office 3,510,810
Patented May 5, 1970

3,510,810
ROTOR ACTUATOR
Lonnie J. Richardson, Elgin, Ill., assignor to Oak Electro/Netics Corp., a corporation of Delaware
Filed Nov. 9, 1967, Ser. No. 681,748
Int. Cl. H01h 51/20
U.S. Cl. 335—68                                    9 Claims

ABSTRACT OF THE DISCLOSURE

A rotor actuating means for use in a rotary solenoid driven switch to provide for specialized switching functions of one switch section independently of the other switch sections. Means are provided for rotating the rotor of the one switch section in one direction from a first position to a second position in response to pulsation of the solenoid. A rotor actuator is moved by the drive shaft of the rotary switch in the one direction in response to pulsation of the solenoid and is stopped at a predetermined point whereupon the shaft continues to rotate in the one direction. As the shaft is rotated in the opposite direction, the actuator again moves with the shaft in the opposite direction, and causes the rotor of the one switch section to shift back to its first position.

---

The principal object of this invention is to provide a rotor actuating means for use in a rotary switch.

Another object of this invention is to provide a rotor actuating means of the character described for providing specialized switching functions of one switch section of the rotary switch independently of the other switch sections.

Still another object of the invention is to provide a rotor actuator of the character described which limits the rotation of the rotor for one switch section to one position while permitting the rotors of other switch sections to rotate two or more positions.

A further object of this invention is to provide a rotor actuator of the character described which grips the drive shaft of the rotary switch by friction and moves with the shaft to a predetermined point whereupon the actuator is stopped as the shaft continues to rotate in the one direction. On reversal of the direction of rotation of the shaft, the actuator again moves with the shaft in the opposite direction and shifts the rotor back to its initial position.

Further objects and advantages will become apparent from the following detailed description taken in connection with the accompanying drawings.

DESCRIPTION OF THE DRAWINGS

FIG. 1 is an elevation view of a rotary solenoid driven switch embodying the invention;

FIG. 2 is a section view taken generally along the line 2—2 of FIG. 1, with the rotor and rotor actuator in an initial or starting position;

FIG. 3 is a partial section view similar to that of FIG. 2, with the rotor and rotor actuator in their extreme opposite positions;

FIG. 4 is a fragmentary section view taken generally along the line 4—4 of FIG. 2;

FIG. 5 is a fragmentary section view looking at the opposite side of the rotor actuator as viewed in FIG. 2, and illustrating a modified form of the invention;

FIG. 6 is a fragmentary section view taken generally along the line 6—6 of FIG. 5; and FIG. 7 is a section view taken generally along the line 7—7 of FIG. 6.

DETAILED DESCRIPTION OF THE INVENTION

The rotor actuating means of this invention is shown as embodied in a rotary solenoid driven switch, generally designated 10 in FIG. 1. A rotary solenoid 12 has a rotary plate 14 on the left-hand side of the solenoid as viewed in FIG. 1. The plate is secured to a shaft which extends through solenoid 12. A coupling, generally designated 16, includes a ratchet disc which has a series of ratchet teeth spaced at regular angular intervals around the disc. The disc is intermittently rotated when the rotary solenoid is pulsated in response to energization of the solenoid winding. A complementary ratchet assembly is disposed around a driven shaft 18 such that the shaft, in turn, is intermittently rotated in response to pulsation of the solenoid 12. Details of the mechanism can be found in Patent No. 2,820,370.

The rotor actuating means of this invention is designed to provide specialized switching functions of one switch section 20 of the solenoid switch independently of the other switch sections, such as 22 (FIG. 1). As will be more fully set forth below, the rotor actuating means limit the rotation of the rotor of switch section 20 to one position while the other rotors of the other switch sections, such as 22, are permitted to rotate two or more positions in response to intermittent rotation of shaft 18. The rotation of shaft 18 in one direction is caused by pulsation of the rotary solenoid 12, and the shaft may be turned manually in the opposite direction.

The rotor actuating means for switch section 20 includes a rotor drive ring 24 (FIG. 2) on one side of the stator 26 of switch section 20. The rotor drive ring is fastened to a rotor which is free to rotate relative to shaft 18. Fastened to the opposite side of the rotor is a contact blade which is electrically isolated from the rotor drive ring. The rotor drive ring 24 may be a partial metal ring (as illustrated in the drawings) or a full metal ring similar to the rotor blade on the opposite side of stator 26. The drive ring includes a radially projecting finger 28 provided for a purpose hereinafter set forth.

In order to move the rotor drive ring 24 one angular position from the positon shown in FIG. 2 to the position shown in FIG. 3, a drive yoke 29 (FIG. 1), having a drive arm 30 extending parallel to shaft 18, is pulsed in the direction of arrow A by solenoid 12 for engaging the finger 28 of the rotor drive ring 24. Pulsing of the solenoid causes the drive yoke arm 30 to engage the finger 28 of the drive ring 24 at point B (FIG. 2) and moves the rotor drive ring and the rotor of switch section 20 to the position shown in FIG. 3. The rotor drive ring and rotor remain in this position for all additional pulses of the solenoid until the rotation of shaft 18 is reversed, as set forth below.

A rotor actuator 32 is positittioned about shaft 18 adjacent the rotor drive ring 24 and has a ring portion 32a which normally grips the shaft by friction to rotate therewith. Projecting radially from the rotor actuator 32 are two lugs 32b, 32c which serve as stops for defining the limits of movement of the actuator with shaft 18. The arms are spaced to allow rotation of the actuator equal to one detent increment of the rotary shaft 18. Of course, the arms of the actuator may be spread to allow for movement equal to two or more positions if desired. The rotor actuator moves with shaft 18 incrementally in the direction of arrow C (FIG. 2) until lug 32c engages a stop pin 34 (see FIG. 3). In this posittion, drive shaft 18 slips within the ring portion 32a of the rotor actuator and continues to rotate incrementally in the directtion of arrow C in response to pulsation of the solenoid.

To return the rotor of switch section 20 back to its original position, the direction of rotation of shaft 18 is reversed by manually turning the shaft in a direction opposite arrow A (FIG. 2). On reversing the rotation of shaft 18, the ring portion 32a of rotor actuator 32 again grips the shaft by friction and rotates with the shaft until the actuator engages finger 28 of the rotor drive ring 24 and moves it and the rotor back from the position shown in FIG. 3 to the initial position shown in FIG. 2.

A modified form of the invention is shown in FIGS. 5 through 7, and like numerals will be applied to the same members as described in regard to FIGS. 1 through 4. In this form of the invention, a detent plate 36 is provided for movement with shaft 18 and has a "double-D" shaped central aperture 38 embracing shaft 18 immediately adjacent the rotor actuator 32. The detent plate 36 has a plurality of holes or recesses 40 forming detents in which a detent ball 42, carried in an aperture 44 in the rotor actuator 32, is seated. The number of detent holes 40 and their angular disposition about detent plate 36 preferably correspond to the multiple switching positions of shaft 18. Referring to FIG. 6, a bearing plate 46 is positioned on the side of rotor actuator 32 opposite detent plate 36 and is biased against the ball 42 in the direction of the detent plate by a spring plate 48 held in position by a spacer washer 50 positioned about a strut assembly 52. It should be noted that strut assembly 52 in the embodiment illustrated comprises the stop 34 for engaging lugs 32b, 32c of rotor actuator 32. Detent plate 36 is held in place by a back-up plate 54 (FIG. 6) and a positioning plate 56 which is secured to strut assembly 52.

The operation of the form of the invention shown in FIGS. 5 through 7 is similar to that of the structure shown in FIGS. 1 through 4 except that instead of relying upon a frictional engagement between the rotor actuator 32 and the shaft 18, the above-described detent mechanism provides a slip clutch type structure for moving the rotor actuator in one direction or the other in response to rotation of shaft 18. With reference to the position of the various members as seen in FIG. 5, as shaft 18 is rotated in the direction of arrow D, the detent ball 42 which is seated in one of the holes 40, in effect, couples the rotor actuator 32 with the detent plate 36 which is fixed to the shaft. In the position shown in FIG. 5, should the shaft 18 be rotated in a direction opposite arrow D, lug 32c of rotor actuator 32, being in abutment with stop pin 34 (or strut assembly 52), will prevent the actuator from rotating. Detent plate 36 will then rotate with shaft 18 and force the detent ball 42 out of the particular detent hole 40 in the direction of arrow E (FIG. 6) against the biasing of spring plate 48. Shaft 18 and detent plate 36 may be rotated any number of switch positions in a direction opposite that of arrow D without moving the rotor actuator 32 therewith. However, when the shaft and the detent plate are stopped in any switch position the detent ball 42 will seat in the corresponding detent hole 40 in the detent plate and thereby hold the rotor actuator 32 in its position with lug 32c abutting the pin 34.

The foregoing detailed description has been given for the rotor actuator 32 completely independent of any frictional engagement between shaft 18 and the ring portion 32a of rotor actuator 32. It can be seen that this structure has utility in those instances where maintaining proper tolerances for a frictional engagement between the shaft 18 and the rotor actuator ring part 32 is either undesirable or expensive.

The foregoing detailed description has been given for clearness of understanding only and no unnecessary limitations should be understood therefrom as some modifications will be obvious to those skilled in the art.

I claim:

1. In a rotary switch a rotor actuating means for providing specialized switching functions of one switch section independently of a second switch section, comprising: a drive shaft mounted on a frame for incremental rotation in a given direction, said switch sections being disposed along said drive shaft with means mounting the rotor of said one switch section for independent rotation relative to said drive shaft and with the rotor of said second switch section being driven by said drive shaft; means rotating the rotor of said one switch section in said given direction from a first switch position to a second switch position in response to rotation of said drive shaft in said given direction; stop means limiting the movement of said rotor actuator with said drive shaft in said given direction while permitting said shaft to continue rotation in said first direction; and a rotor actuator rotatable with said drive shaft and being positioned to move the rotor of said one switch section back to said first switch position in response to reversing the direction of rotation of said drive shaft.

2. The rotor actuating means of claim 1 wherein said rotor actuator grips said drive shaft by friction and said stop means extends into the path if movement of said rotor actuator to stop said rotor actuator at a predetermined point and permit the shaft to slip within said actuator as the shaft continues to rotate in said given direction.

3. The rotor actuating means of claim 2 wherein said rotor actuator has a portion extending radially outwardly from said shaft, said stop means extending axially of said shaft into the path of movement of said radially extending actuator portion.

4. The rotor actuating means of claim 1 including a detent mechanism connecting said rotor actuator to said drive shaft to move said rotor actuator with said drive shaft in said given direction and permit the shaft to continue to rotate in said given direction as the rotor actuator is stopped by said stop means.

5. The rotor actuating means of claim 4 wherein said detent means includes a detent plate secured to said drive shaft for rotation therewith, said detent plate having series of recesses angularly spaced about said shaft, and a spring biased ball carried by said rotor actuator in alignment with said series of recesses and normally urged against said detent plate such that said rotor actuator is moved with said drive shaft when said ball is seated in one of said recesses and said spring biased ball yielding to permit the shaft to continue to rotate in said given direction as the rotor actuator is stopped by said stop means.

6. The rotor actuating means of claim 1 wherein said switch is a rotary solenoid driven switch with the rotor of said one switch section being rotated in said given direction in response to pulsation of the solenoid and including a rotor drive ring secured to the rotor of said one switch section for rotation therewith independent of said drive shaft, and a drive yoke pulsed by the solenoid for engaging said rotor drive ring to move said drive ring and said rotor from said first position to said second position in response to pulsation of the solenoid.

7. The rotor actuating means of claim 6 wherein said rotor drive ring has a portion extending radially outwardly and said drive yoke has an arm extending axially of said shaft for engaging said radially extending drive ring portion to move the drive ring and rotor from said first position to said second position in response to pulsation of the solenoid.

8. The rotor actuating means of claim 7 wherein said rotor actuator has a portion for engaging said radially extending drive ring portion to move said drive ring and said rotor back to said first position in response to reversing the direction of rotation of said drive shaft.

9. In a rotary switch a rotor actuating means for providing specialized switching functions of one switch section independently of a second switch section, comprising: a drive shaft mounted on a frame for incremental rotation in a given direction, said switch sections being disposed along said drive shaft with means mounting the rotor of said one switch section for independent rotation relative to said drive shaft and with the rotor of said second switch section being driven by said drive shaft; means rotating the rotor of said one switch section in said given direction from a first position to a second position in response to rotation of said drive, shaft means holding said rotor in said second position as the drive shaft continues to rotate in said given direction, and means rotating the rotor of said one switch section back to said first position in response to reversing the direction of rotation of said drive shaft.

References Cited

UNITED STATES PATENTS

| | | | |
|---|---|---|---|
| 1,673,607 | 6/1928 | Tulloch | 200—45 |
| 2,891,617 | 6/1959 | Wharton | 200—38 |
| 3,405,376 | 10/1968 | Giese | 335—138 |

BERNARD A. GILHEANY, Primary Examiner

H. BROOME, Assistant Examiner

U.S. Cl. X.R.

200—45